US008217620B2

(12) United States Patent
Hanssen et al.

(10) Patent No.: US 8,217,620 B2
(45) Date of Patent: Jul. 10, 2012

(54) METHOD AND SYSTEM FOR RETROFITTING A FULL HYBRID TO BE A PLUG-IN HYBRID

(75) Inventors: Greg Hanssen, Irvine, CA (US); Peter F. Nortman, Monrovia, CA (US); Daniel Sufrin-Disler, Monrovia, CA (US)

(73) Assignee: Energycs LLC, Monrovia, CA (US)

( * ) Notice: Subject to any disclaimer, the term of this patent is extended or adjusted under 35 U.S.C. 154(b) by 1228 days.

(21) Appl. No.: 11/909,655

(22) PCT Filed: Mar. 31, 2006

(86) PCT No.: PCT/US2006/012054
§ 371 (c)(1),
(2), (4) Date: Sep. 25, 2007

(87) PCT Pub. No.: WO2006/124130
PCT Pub. Date: Nov. 23, 2006

(65) Prior Publication Data
US 2010/0106351 A1      Apr. 29, 2010

Related U.S. Application Data

(60) Provisional application No. 60/667,891, filed on Mar. 31, 2005, provisional application No. 60/668,478, filed on Apr. 5, 2005.

(51) Int. Cl.
*H01M 10/46* (2006.01)

(52) U.S. Cl. ........................................................ 320/104
(58) Field of Classification Search .................. 320/104, 320/107, 132, 149; 324/426, 427, 430, 433; 903/902, 906, 907; 180/65.21, 65.29
See application file for complete search history.

(56) References Cited

U.S. PATENT DOCUMENTS

| 5,487,002 | A  | * | 1/1996  | Diller et al. .................... 320/128 |
| 6,330,925 | B1 | * | 12/2001 | Ovshinsky et al. ......... 180/65.245 |
| 6,868,318 | B1 | * | 3/2005  | Cawthorne et al. ............. 701/22 |
| 2004/0030469 | A1 | * | 2/2004  | MacBain ........................ 701/22 |
| 2007/0181354 | A1 | * | 8/2007  | Andri ........................... 180/65.2 |
| 2007/0205746 | A1 | * | 9/2007  | Iida et al. ...................... 320/151 |
| 2008/0094035 | A1 | * | 4/2008  | Plett ............................. 320/136 |

FOREIGN PATENT DOCUMENTS
JP        2002-349405 A      12/2002
* cited by examiner

*Primary Examiner* — Edward Tso
(74) *Attorney, Agent, or Firm* — Wolf, Greenfield & Sacks, P.C.

(57) ABSTRACT

A retrofit system for converting a hybrid vehicle to a plug-in hybrid comprises a battery for storing a charge sufficient to provide a vehicle with an electric-only driving range in excess of 5 miles, a battery management system for monitoring battery parameters indicative of the state of battery charge to produce a signal indicative thereof; and a control unit responsive the battery management system to report an inflated state of battery charge to the hybrid vehicle's hybrid control system to maintain the gasoline engine in a deactivated condition over an extended driving range.

17 Claims, 10 Drawing Sheets

METHOD AND SYSTEM FOR RETROFITTING A FULL HYBRID TO BE A PLUG-IN HYBRID

PRIORITY CLAIM

Priority of U.S. Provisional Patent Application No. 60/667,891 filed Mar. 31, 2005 and U.S. Provisional Patent Application No. 60/668,478 filed Apr. 5, 2005 are hereby claimed.

TECHNICAL FIELD

This invention relates to hybrid electric vehicles ("HEVs") and, more specifically, to plug-in HEVs.

BACKGROUND

A hybrid vehicle ("HEV") uses multiple propulsion systems to provide motive power. The most commonly available HEV is a gasoline-electric hybrid vehicle, which uses gasoline to power an internal-combustion engine ("ICE") and rechargeable batteries to power an electric motor. A full hybrid, sometimes also called a strong hybrid, is a vehicle that can run on just the engine, just the batteries, or a combination of both.

Mass-produced full hybrid HEVs, such as the Toyota Prius, currently recharge their batteries by capturing kinetic energy via regenerative braking and, more predominantly, by using the ICE to run the electric motor as a generator during periods of cruising or idling to produce battery-charging current. By contrast, wholly electric vehicles use batteries charged by an external source such as the grid or a generator mounted on a towed trailer.

Nearly all commercially available hybrids use gasoline as the fuel for the ICE, although some HEVs have been built which use diesel, ethanol, plant-based oils ("biofuels") and the like. HEVs have been developed primarily to lessen dependency on petroleum-based fuel and to minimize the emission of pollutants and greenhouse gases while maintaining a level of performance acceptable to the purchasing public. HEVs have accomplished this to a significant degree, achieving mileages of 50-70 mpg.

A full hybrid, sometimes also called a "strong hybrid", is a vehicle that can run on just the engine, just the batteries, or a combination of both. As is known to those of ordinary skill in the art, the differing "torque vs. RPM" characteristics of the internal combustion and electrical motors operate synergistically; an internal combustion engine's torque is minimal at lower RPMs, since the engine must be its own air pump. Thus, the need for reasonably rapid acceleration from a standing start results in an engine which is much larger than required for steady speed cruising. On the other hand, an electrical motor exhibits maximum torque at stall; therefore this engine is well suited to complement the internal combustion engine's torque deficiency at low RPMs, allowing the use of a much smaller and therefore more fuel efficient engine.

A smaller, less flexible ICE may accordingly be used that is designed for maximum efficiency, often using variations of the conventional Otto cycle, such as the Miller or Atkinson cycle that contribute significantly to the higher overall efficiency of the vehicle, with regenerative braking playing a much smaller role. A computer oversees operation of the entire system, determining which of the ICE and electric motor should be running, or if both should be in use (e.g., for short bursts additional power or for battery charging), shutting off the ICE when the electric motor is sufficient to provide the power.

While less emissive and more energy-efficient than HEVs, battery electric vehicles have been held back by perceived range limitations, charge-time requirements and battery expense. Ranges of 100-200 miles per charge are currently obtainable, but the public perceives that it needs greater range despite studies showing that most commuters drive less than 50 miles per day. Charge times (0-100%) of 5-7 hours are unattractive to the public, which has yet to appreciate that charge time is not critical when charging is performed overnight. Battery expense remains a challenge, but is primarily a consequence of a lack of mass production of the battery chemistries having the best fit for BEV use.

Research and development activity has accordingly been directed by some into a class of vehicles commonly referred to as "plug-in hybrid electric vehicles" ("PHEVs"). The current focus of attention of hobbyists and, perhaps, one or more members of the auto industry, PHEVs are HEVs whose batteries can be recharged from the electrical power grid and which can accordingly provide a limited "electric-only" range without the use of the ICE. The PHEV can accordingly be ICE-independent (e.g., gasoline-independent) at moderate speeds for daily commuting, and yet have the extended range of a hybrid for long trips, thereby producing even less fewer emissions than an HEV.

The degree of environmental benefit from a PHEV depends, of course, on the source of the electrical power. Electricity generated by wind, solar, and/or other renewable sources will be cleaner than electricity generated with coal, the most polluting source, for example. Electricity generated with coal in a central power plant, however, is still much cleaner than pure gasoline propulsion, due to the much greater efficiencies of a central plant, and the relatively easier monitoring and upgrading of pollution-control measures at stationary sources. Since the range of a PHEV is not limited by battery capacity, it should be more publicly acceptable than a pure EV. Since it is only preferable, but not necessary, that it be plugged into the grid, charge times are not at issue either. It should be understood, incidentally, that the term "grid" includes such local sources of electricity as rooftop solar or other local renewable sources such as windmills, fuel cells and the like. All sources of charging current that are external to the vehicle are within the scope of the term "grid" as used herein.

Similarly, the invention herein is not dependant on the particular cycle or particular fuel of the ICE. Similarly, it is known that the ICE can be fueled by diesel, plant-derived fuels, synthetic fuels, hydrogen, mixtures of some of the foregoing and so forth. It can use an Otto cycle, Miller cycle, Atkinson cycle, or any other desired cycle. All are within the scope of this invention.

Lastly, it should be recognized that this invention is not limited to HEVs using an ICE. As will be clear, a vehicle using an external combustion engine, fuel cell or other source of motive power that relies on non-grid fuel are within the scope of the invention.

While HEVs are being offered to the public in increasing numbers, there are currently no PHEVs available despite the clear advantages of a PHEV.

SUMMARY OF THE INVENTION

The invention herein is a PHEV system and method for retrofitting hybrid vehicles that are not manufactured with the ability to utilize energy input from the utility grid. The invention is directed to utilizing the vehicle's hybrid electronic system, providing the same power delivery capability, and operating within the limits of the vehicle platform as it was delivered; i.e., without the grid connectable features added by this invention.

Existing hybrid vehicles are configured to maintain their SOC ("state of charge") near the capacity midpoint, between approximately 30% and 80% state of charge. This allows for absorption of regenerative braking, better battery thermal management, and longer battery life. An SOC target of 55-65% is frequently used. Under normal driving conditions, the hybrid system will attempt to charge the battery when it is below its SOC target, or attempt to discharge an overly charged battery in order to reach its SOC target.

In rare instances, the SOC will be outside the 30-80%. The normal SOC target may be adjusted occasionally to condition the batteries or provide needed vehicle performance under rare driving conditions. In cases where extra power is needed (e.g., to accelerate), the typical hybrid will allow the battery to discharge to a small extent below its SOC target. In cases where additional regenerative power is available (e.g., while driving down a steep hill or decelerating) the typical hybrid will allow the battery to charge to a small extent over its SOC target.

A PHEV retrofit system constructed in accordance with the invention takes advantage of the normal hybrid operating modes just described by providing a battery capacity that is larger than currently used in HEVs, and then reporting an inflated SOC to the vehicle. This causes the vehicle's hybrid control system to take action to discharge the battery. The additional electrical energy from the larger battery capacity thus displaces gasoline that would have otherwise been used.

Some hybrid vehicles may contain built-in software or hardware facilitating or allowing an "electric vehicle" (EV) mode, wherein the ICE is disabled. This is true, for example, of the Toyota Prius sold in Japan and in some other countries. The EV mode may be restricted in terms of operating envelope, depending on mechanical requirements of the drivetrain, battery capacity, catalyst temperature and SOC or electrical power availability. It is intended, according to Toyota, to permit drivers in densely-populated housing to exit from their parking places without disturbing adjacent residents. In its preferred form, the retrofit system herein takes advantage of an EV mode, if present, by enforcing the EV mode whenever the advanced battery system has sufficient charge and the vehicle speed, catalyst state and power requirements are acceptable to the existing hybrid system to allow EV mode.

The invention will be described with regard to the retrofitting of a Toyota Prius, although it will be understood that the invention is not limited to that vehicle. As used throughout this specification:

"Battery" means electrical energy storage medium. A battery can be an electrochemical storage system such as is found in Lithium Ion chemistries, Nickel Metal Hydride chemistries, or Lead Acid battery chemistries. The term "battery" as used herein, can also refer to electrostatic storage devices such as (for example) capacitors;

"Battery Control Module" means a device or set of devices which directly or indirectly perform some or all of the following functions: Contactor control; battery system status monitoring and reporting; battery system fault reporting; collection of data about the battery system, including voltages and temperatures of modules, voltage and current of the pack; battery thermal system control; response to other system faults to protect battery and other systems connected to it, the user, and service personnel. Where the above functions are performed by several devices, only those devices that control the functionality required to practice the invention need be replaced when the replacement of the Battery Control Module is referred to in this specification.

"CAN/485 Module" is a module capable of communicating with the LCM (see below) or equivalent monitoring hardware, the vehicle communication bus, and the battery thermal control system for the vehicle if present. A person of ordinary skill in the art will, of course, be able to adapt this module to different vehicles and thermal control architectures, and all such adaptations are within the cope of this invention. The CAN/485 Module also has extra inputs and outputs that can be used to control contactors or charging. The CAN/485 module is so named herein because of the LCM requirements to communicate over RS485 and the Toyota Prius' requirements to communicate over CAN. A person of ordinary skill in the art will understand that this module can be modified to use different communication protocols as required by its vehicle interface and the battery monitoring interface, and that all such modifications are within the scope of this invention;

"CDU" or "Control & Display Unit" is a controller constructed in accordance with the invention to replace the existing battery system controller on a stock hybrid vehicle. The CDU may include a display that is capable of showing the user different information than the stock display, if any, and accordingly includes means for communicating with the vehicle's communication bus, and means for manipulating hardware relating to the stock hybrid's "EV-only" mode (if present, such as on models of the Prius currently sold in Japan and in some other countries). Other controllers might be capable of performing the same functions of the CDU. The CDU also has general purpose inputs and outputs that could be used to control "FAT" means "file allocation table";

"Gasoline", as used herein" means gasoline, petrol and/or all other hydrocarbon-based fuels such as compressed natural gas, diesel, liquified petroleum gas. It also includes plant-based and alcohol-based fuels, and hydrogen when hydrogen is used as an "on board" fuel source for vehicle propulsion;

"LCM" means Lithium Cell Monitor/Manager. The LCM collects and reports cell voltages and temperatures within the battery pack of the described invention. The LCM also "balances" the cells of the battery pack. Other devices performing the same functions may be used to achieve these and are, to that extent, considered an LCM as defined herein;

"LED" means "light emitting diode". Lamps or other indicators may be used, including audible cues which help the driver operate the vehicle in its most efficient modes, and all such alternative indicating devices are included within the scope of this invention;

"SOC" or "State of Charge" is the ratio of available useable battery capacity to total usable capacity of the battery, expressed as the percentage; and "VIT" means Voltage, Current and Temperature node. The VIT measures bulk battery system voltage, current and an additional temperature within the battery system. Other devices performing the same functions may be used to achieve these results of the invention and are, to that extent, considered an LCM as defined herein.

Additional details concerning the invention will be provided in the following detailed description of the preferred embodiment, of which the Drawing forms a part.

DESCRIPTION OF THE DRAWING

FIG. 1 illustrates one basic and common architecture for the distributed control aspects of a hybrid vehicle including the use of multiple microcontrollers 1,70,72,74 and a battery control module 5 attached to a common, parallel, multidrop communication bus 3. As shown in FIG. 1, the battery control module 5 is electronically coupled to a basic hybrid battery 4 and fan 6 to monitor and control the fan and the charging/discharging of the battery through the use of contactors and sensors as is known in the art.

FIG. 10 is front elevation view of another viewing screen of the CDU of FIG. 8, showing the reported SOC of 79.5% along with the true SOC of 16 diamonds.

FIG. 11 is front elevation view of another viewing screen of the CDU of FIG. 8, showing the reported SOC of 73% along with the true SOC of 3 diamonds.

DETAILED DESCRIPTION OF THE PREFERRED EMBODIMENT

The invention herein allows a hybrid vehicle with small on-board battery to be retrofitted with new control electronics and a larger battery such that the battery may be externally charged and the additional electrical energy within the battery used to offset gasoline or other fuel consumption for a given time or distance, or for a user-selectable series of times and distances, until the larger battery is deemed depleted and operation returns to pre-existing hybrid operating mode.

The following detailed description is directed to the retrofitting of a Toyota Prius to provide it with a grid-chargeable electric-only range of 40-60 miles. The Prius was chosen because it is currently the most popular of the hybrids. The range was chosen to strike a balance between the expected daily range of real-world commuters in the U.S., on the one hand, and the current cost of useable batteries, on the other hand. Those of ordinary skill in the art will recognize that this capability can be adjusted as warranted by public need, public expectation and desires, and battery costs (which are expected to decrease in the future as new chemistries are discovered and mass production techniques take over.

Figure 1:
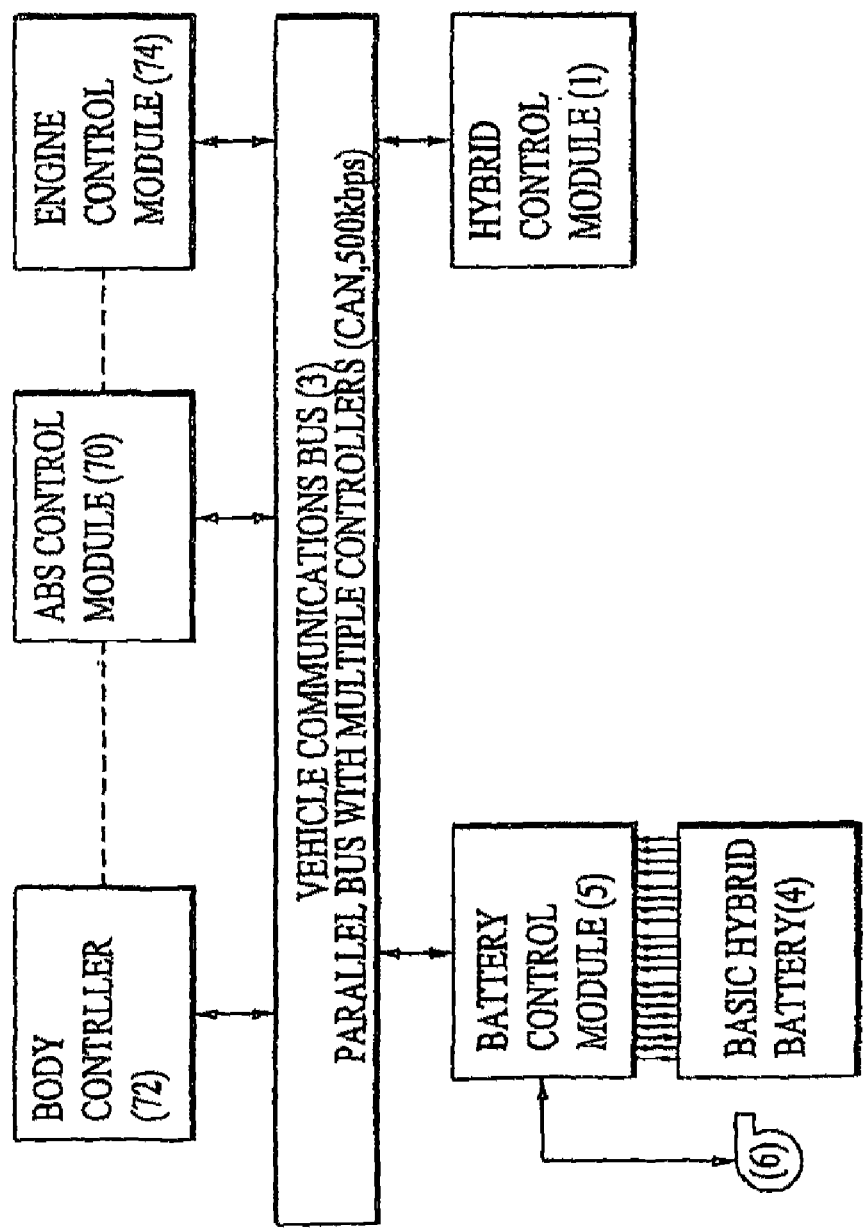
FIG. 1 is a simplified block diagram schematic of the operating system of one hybrid vehicle currently available for purchase (the Prius) which is adapted to utilize the invention.
Figure 2:
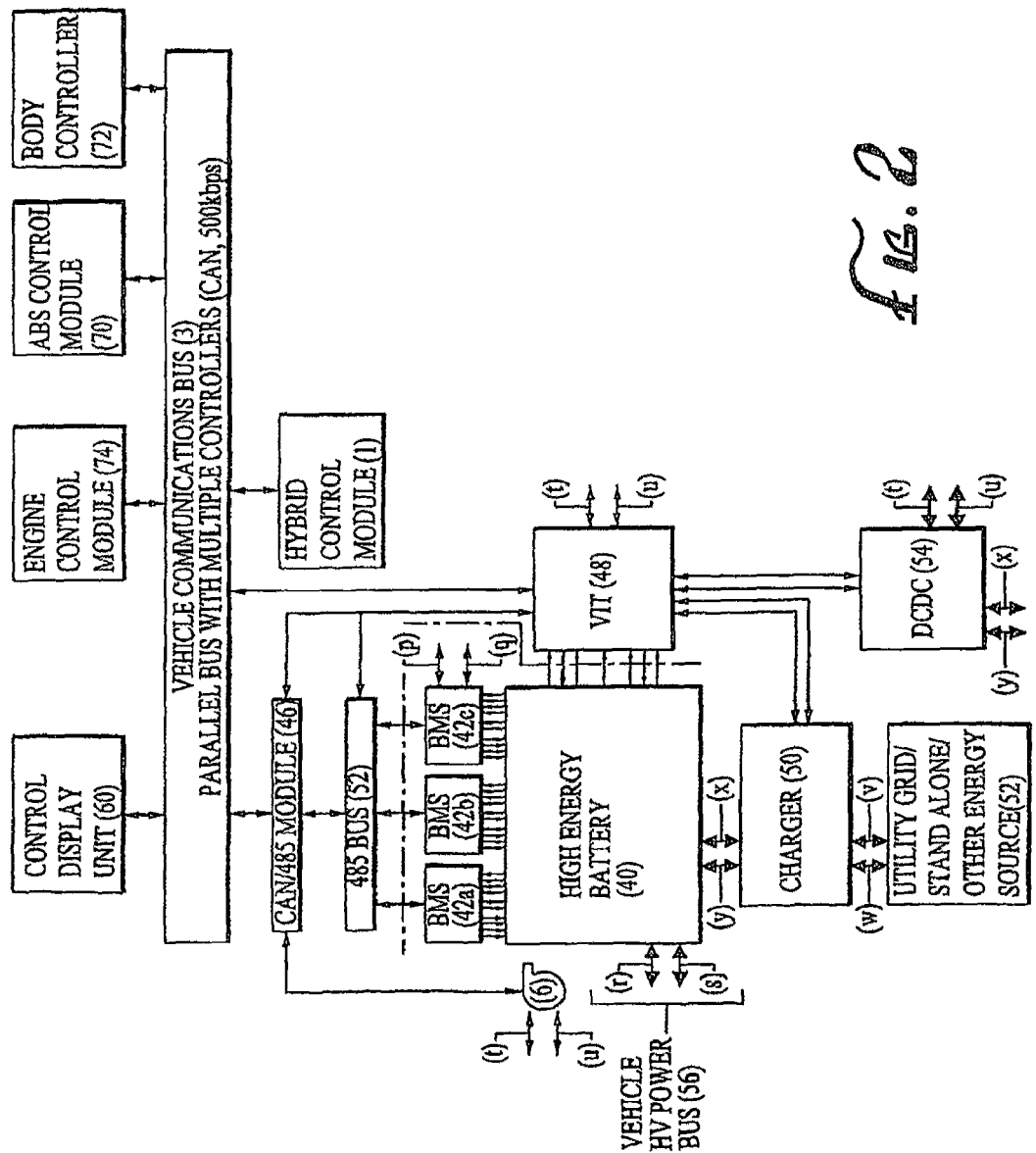
FIG. 2 is a block diagram schematic of a currently available HEV operating system as modified by a retrofit system constructed in accordance with the invention. The location of this embodiment of the invention's communication nodes 44, 46, 48, 52 and their relationship to the vehicle parallel bus 3 can be achieved in other ways, as one of ordinary skill in the art may utilize other single or multiple controller architectures to achieve the same functionality. Note that the charger is not essential for proper operation of the invention but is part of the preferred embodiment of the invention; an on-board charger facilitates refueling flexibility and the utilization of a wide variety of renewable energy generation possibilities which could be electrically connected and are not presently available for use in conventional transportation; More specifically, an on-board charger permits charging from virtually any 120 v or 240 v socket so that virtually any building becomes a charging location. Moreover, the ability to charge the battery at virtually any facility lends itself to the use of the vehicular charge by the grid during peak energy usage periods when relatively highly emissive peak generators would otherwise come on line, since the vehicle's battery could then be recharged when peak demand subsides.

The preferred embodiment utilizes the space taken by the original battery system of a prior art hybrid vehicle, shown as FIG. 1, replacing it with the system shown in FIG. 2. In the preferred embodiment, several components have been consolidated into a single component, as one of ordinary skill in the art will appreciate the opportunity to eliminate redundancies and streamline control strategies. The communication backbone of the system is the vehicle's own CAN bus 3, which connects the control display unit ("CDU") 60, VIT 48 and the CAN/485 module 46 in communication with the vehicle Hybrid Control Module 1. The vehicle Hybrid Control Module is not changed, and no other controllers on the vehicle, such as ABS Control Module 70, Body Controller 72 and Engine Control Module 74 have been replaced. The high energy battery 40 of the invention is monitored by the battery maintenance systems ("BMS") 42a-c and the VIT 48. The BMS are preferably LCMs, as defined above, which are available from EnergyCS (Monrovia, Calif. USA) as Part No. LiBMSv2. In addition, details concerning the LCM are provided in U.S. Provisional Patent Application No. 60/668,478 the content of which is hereby incorporated by reference and made part of this specification.

Information from these blocks is processed and transmitted between them and the rest of the vehicle over a parallel bus, such as RS485 or CAN. In the preferred embodiment, the features of the VIT 48 have been combined with blocks 52 and 46 to create a single controller card that takes less space and is more efficient. The VIT 48 monitors pack level voltage and current, as well as high voltage battery system isolation from the chassis. The BMS 42a-c monitors cell voltages and temperatures, and balances all of the cells within the high energy battery 40 by incrementally discharging selected cells. The charger 50 is controlled by the VIT 48 either by serial communication link, discrete on/off control, or a pwm signal relative to desired power output. The DCDC 54 is also controlled by the VIT 48 and supports the 12V system during charging and stand times. The VIT has a real time clock and is capable of waking up the entire system whenever the vehicle is connected for charging or has been powered on. The real time clock wakes up the system infrequently and periodically to observe status of the battery, during times when the vehicle is not being driven or charged. The VIT 48 and CDU 60 communicate directly with the vehicle systems. Messages for battery voltage and current are required by the hybrid control module 1 at high rates. Other messages, such as state of charge can be reported less frequently. The CDU 60 and VIT 48 provide all the messages needed to maintain full functionality of the vehicle balance of plant, controlled by Hybrid Control Module 1, ABS controller 70, body controller 72, engine controller 74 and the like. The charger is connected via a short power cord which allows for an easy disconnect and break-away feature if the vehicle moves while connected to an external energy source 52 for charging the battery 40. One of ordinary skill in the art will recognize that an additional fan may be required and added to independently cool the charger, similar to fan 6 and controllable by VIT 48 or by connection to the external energy source for charging the battery.

Those of ordinary skill in the art will recognize that the battery system on the hybrid vehicle to be converted could be supplemented by the system described herein, or wholly replaced by the described system herein. Early prototypes of this system, in fact, utilized a two-battery system approach which maintained the usability of the original system in parallel with a predecessor embodiment similar to that depicted in FIG. 2. The preferred embodiment, however, uses a single battery system to simplify vehicle management and component count.

Existing hybrid vehicles are configured to maintain their SOC near the capacity midpoint, between approximately 30% and 80% state of charge. This is the most efficient operating range and allows for absorption of regenerative braking, better battery thermal management, and longer battery life. A SOC target of 55-65% is frequently used. Under normal driving conditions, the hybrid system will attempt to charge the battery when it is below its SOC target, or attempt to discharge an overly charged battery in order to reach its SOC target.

In rare instances, the SOC will be outside the 30-80%. The normal SOC target may be adjusted occasionally to condition the batteries or provide needed vehicle performance under rare driving conditions. In cases where extra power is needed (e.g., to accelerate), the typical hybrid will allow the battery to discharge to a small extent below its SOC target. In cases where additional regenerative power is available (e.g., while driving down a steep hill or decelerating) the typical hybrid will allow the battery to charge to a small extent over its SOC target.

A retrofit system constructed in accordance with the invention takes advantage of the normal hybrid operating modes just described by providing a larger-than-stock battery capacity and reporting an inflated or adapted SOC to the vehicle. This causes the manufacturer's hybrid control system to take action to discharge or charge the battery with regenerative braking. The additional electrical energy from the larger battery capacity thus displaces gasoline that would have otherwise been used.

Some hybrid vehicles may contain built in software or hardware facilitating or allowing an "electric vehicle" (EV) mode, where in the ICE is disabled. This is true, for example, of the Toyota Prius sold in Japan and in some other countries. The EV mode may be restricted in terms of operating envelope, depending on mechanical requirements of the drive train, battery capacity, catalyst temperature and SOC or electrical power availability. It is intended, according to Toyota, to permit drivers in densely-populated housing to exit from their parking places without disturbing adjacent residents. In its preferred form, the retrofit system herein takes advantage of an EV mode, if present, by enforcing the EV mode whenever the advanced battery system has sufficient charge and the vehicle speed, catalyst state and power requirements are acceptable to the existing hybrid system to allow EV mode.

Figure 4:
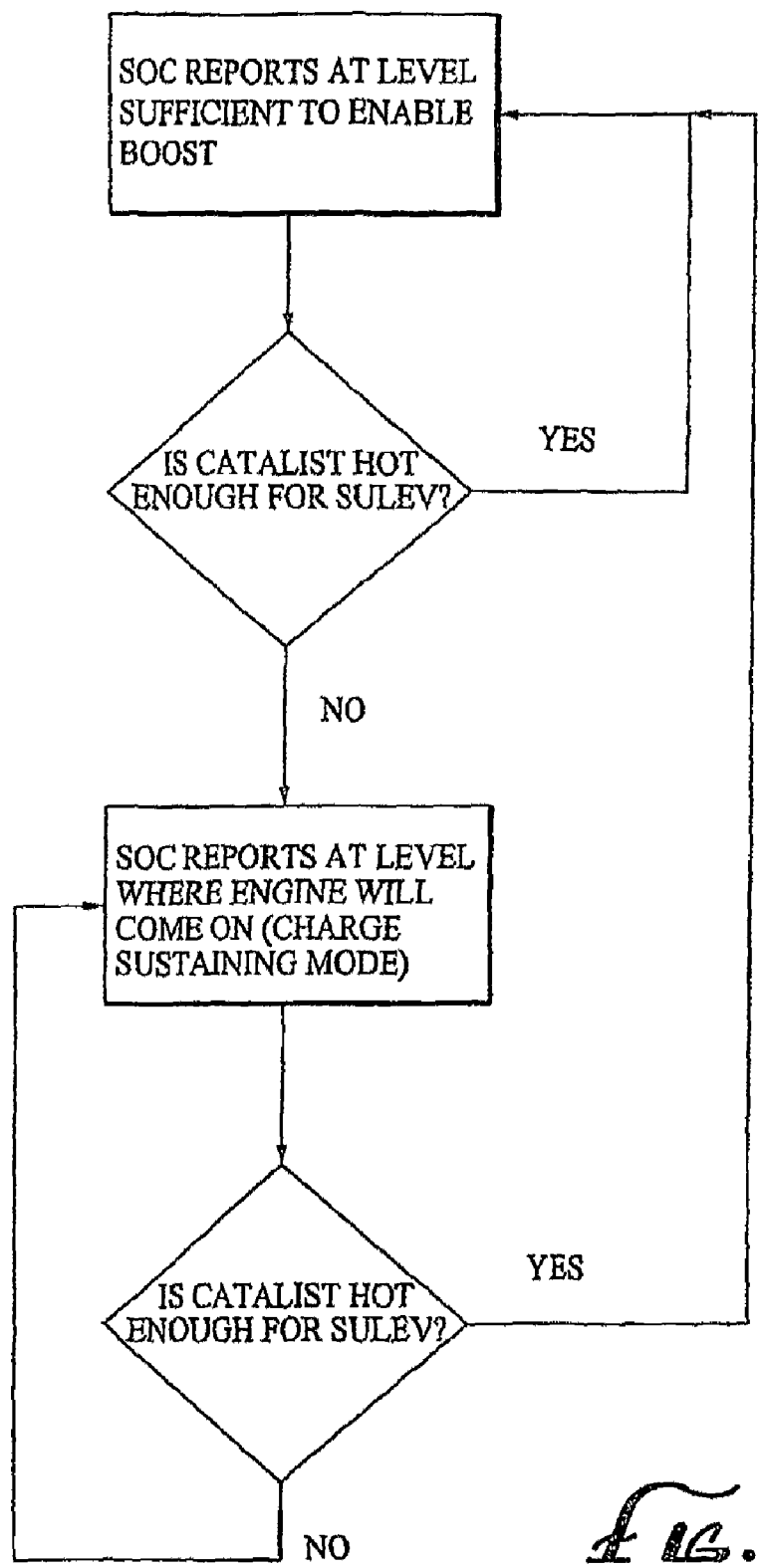
FIG. 4 is a flow chart showing how the reported SOC 300 may be temporarily perturbed to a different level to achieve certain operating characteristics, such as the maintaining of SULEV emissions, or the required lubrication for the transaxle provided only by rotating the engine.
Figure 5:
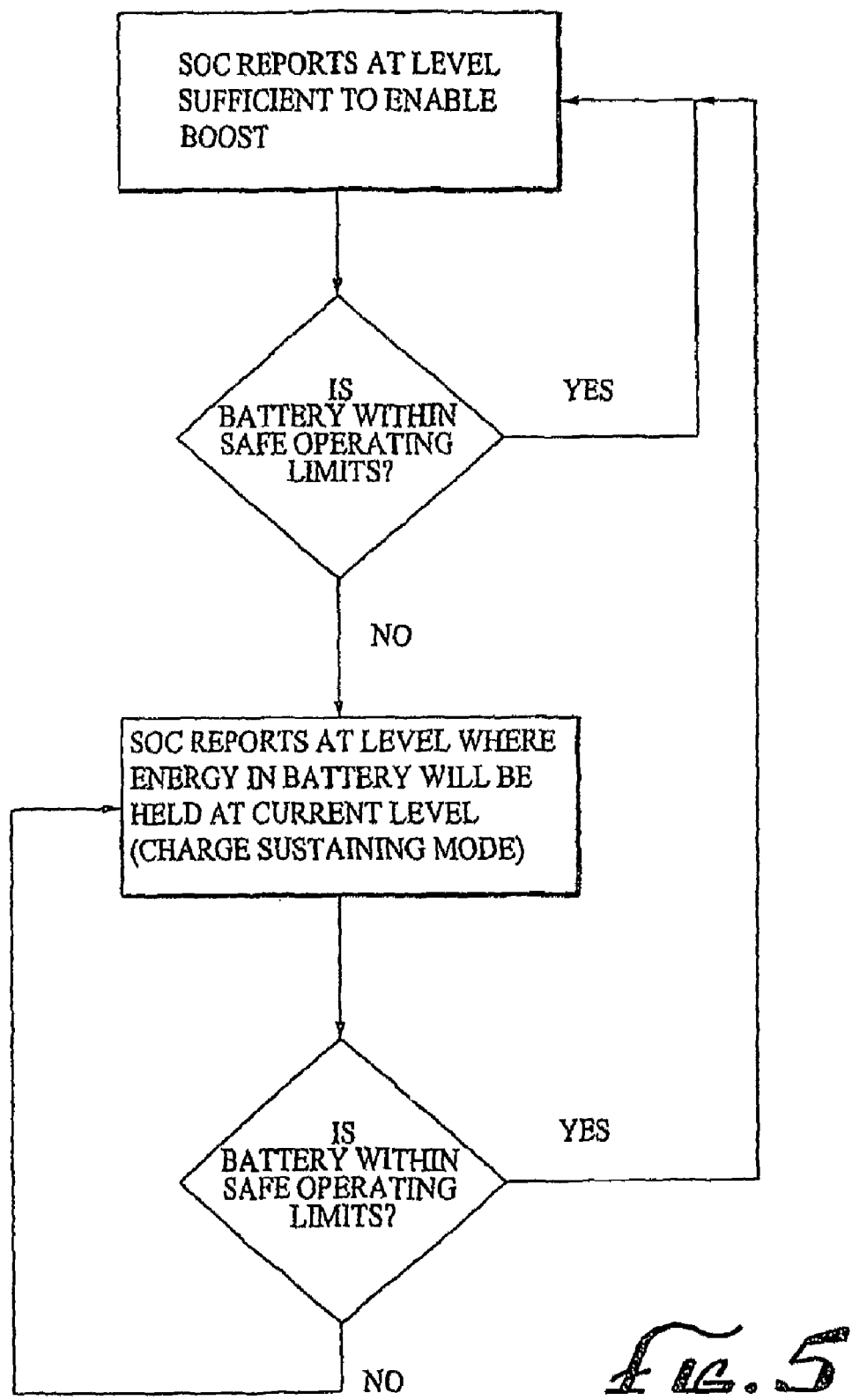
FIG. 5 is a flow chart showing how the reported SOC may be temporarily perturbed to reduce the amount of energy drawn from the battery if it has deviated outside safe operating limits.
Figure 6:
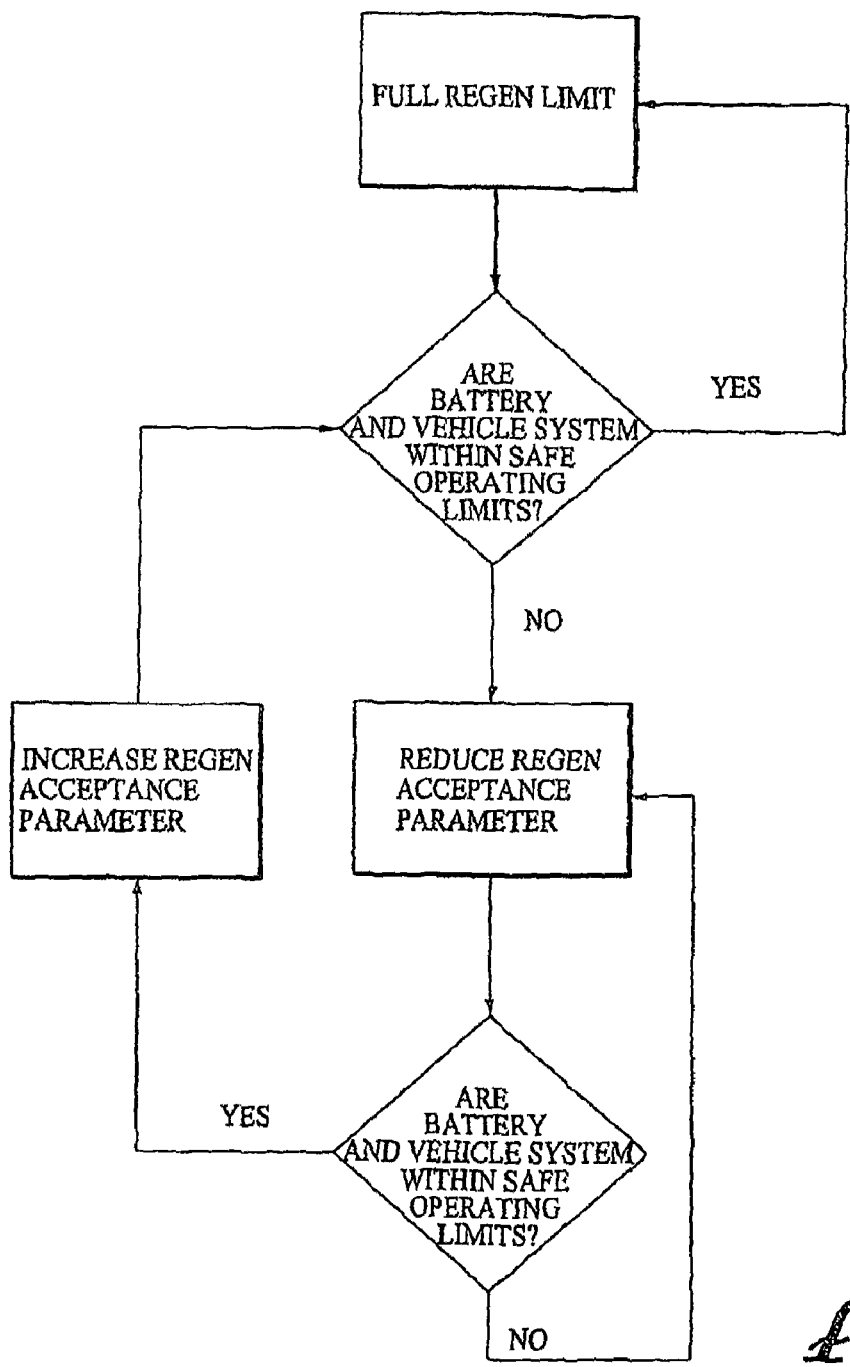
FIG. 6 is a logic diagram of the means by which regen acceptance power limits are sent from the CDU 60 to the Hybrid Control Module 1. One of ordinary skill in the art would observe that it is possible to hold a limit for a time to evaluate whether system status is improving or the limit needs further reduction.
Figure 7:
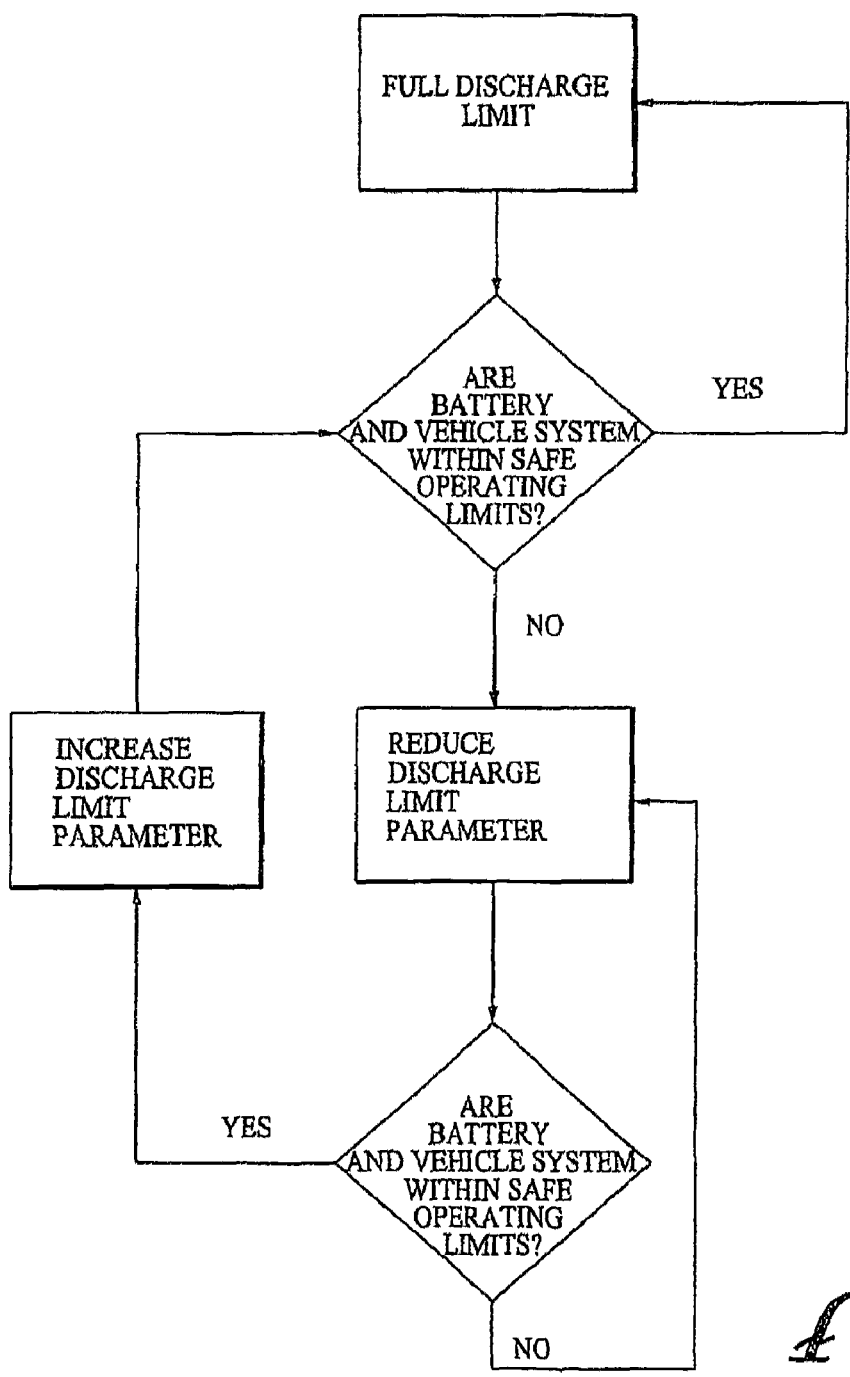
FIG. 7 is a logic diagram of the means by which discharge limits are sent from the CDU 60 to the Hybrid Control Module 1. One of ordinary skill in the art would observe that it is possible to hold a limit for a time to evaluate whether system status is improving or the limit needs further reduction.

The preferred retrofit system does more than simply inflate the SOC reported to the vehicle. It monitors a number of vehicle parameters to ensure that the retrofit system is not interfering with important vehicle parameters (see FIG. 4). If the CDU 60 determines, for example, that the vehicle's catalytic converter temperature is no longer sufficiently hot to maintain the SULEV ("Super Ultra Low Emission Vehicle") rating ascribed to the vehicle by the U.S. Environmental Protection Agency, the CDU changes it's reported SOC (or turns off "EV mode") to encourage the gas engine to turn on and thereby heat the catalytic system to its optimal operating point for minimum emissions. Once the catalytic system has reached sufficient temperature for clean operations, the CDU permits the vehicle to revert to battery discharge mode (as long as there is sufficient actual SOC in the added battery.

If the vehicle engine coolant temperature is high enough, and energy is available in the battery, extended EV mode operation may be achieved at higher speeds.

If the retrofit system's added battery becomes depleted sufficiently so that further discharge is undesirable in view of maintaining optimal battery health or cycle life, the CDU reinstitutes the vehicle's hybrid mode of propulsion by changing the value of reported SOC. As described earlier, the true SOC may be different from the reported SOC; the latter is typically an inflated value transmitted to the existing hybrid control system to encourage battery discharging or battery sustaining modes. The true SOC of the battery is determined by the CDU by measuring and integrating current through the battery and also provides for reset points or waypoints relative to specific voltage triggers or battery temperatures based on information from the BMS 42 a, b, c.

When the true SOC of the added battery is determined to be low enough to cease battery discharge mode and switch to battery sustaining mode, the SOC reported by the CDU to the existing hybrid control system is preferably used to maintain the added batteries without recharging them significantly; the added battery is preferably recharged only by connecting the vehicle to an external electrical energy source such as the g rid. The vehicle is returned to normal hybrid operation, either using the battery provided with the stock system or using the remaining capacity level of the replacement battery. The CDU enforces steady state operation by mapping the low state of charge to a reported SOC near the steady state midpoint target (presently about 62%) and having small deviations from the low battery SOC correspond to large deviations in the SOC reported to the vehicle. Thus, in the normal hybrid mode, the added battery will be more or less sustained at the low true SOC until the added battery can be recharged from the external source.

Those of ordinary skill in the art will recognize that the duration of the "boosted" battery discharge modes (i.e., the electric-only range made possible by this retrofit system) will depend on the amount of added battery capacity and the level at which it is can be safely discharged for optimal battery life. During normal hybrid operating modes (i.e., added-battery charge-sustaining mode) the "EV mode" is no longer enforced or activated.

There are a number of facets that must be taken into account in retrofitting an HEV to provide PHEV capability:

1. The method to replace the existing vehicle battery pack with one of higher capacity (hereinafter, the "advanced battery") and to properly integrate the new pack into the existing vehicle infrastructure, including proper mechanical and thermal design for the battery system being implemented. Different battery capacities, chemistries, form factors and platform applications will require modifications to the exemplary specific implementation described herein.

2. The selection of a battery system with equal or more electrical energy storage when compared to the unimproved vehicle platform, and a battery monitoring system to measure voltages and temperatures, as required, throughout the battery. The battery monitoring system may also measure electric current flowing into or out of the battery system. The battery system may control the flow of coolant over the battery to regulate heating or cooling. The battery system may contain circuitry to balance battery cells as needed to keep all cells in the system at an equal state of charge. The battery system may require that certain circuitry is isolated from the vehicle chassis, while other of its circuitry may be referenced to vehicle chassis. The isolation requirement will be governed by safety and circuit protection requirements, among other things one of ordinary skill in the art will recognize.

3. A control and display unit (CDU) 60, which receives information from the advanced battery and interfaces with the vehicle's hybrid control system so as to encourage the existing hybrid control system to maximize its use of the advanced battery.

4. Preferably, an on-board battery charger 50 to allow the advanced battery system to be charged from a conventional wall plug or renewable energy source anywhere in the world. The battery charger may be capable of charging at a higher rate than a standard wall plug is able to supply if faster charging is desired or a higher power source or EV charging station is accessible. This allows additional EV or boosted range without additional gasoline consumption.

FIG. 1 is a block diagram schematic of a currently available HEV operating system. A hybrid control module 1 communicates with the battery system 2 via a vehicle communication bus 3. The battery system 2 generally comprises a hybrid battery 4 and a battery control module 5. The battery is monitored by the battery control module to acquire such data as cell voltage, cell temperature, current flow, and the like and communicates that data to the hybrid control module 1 via the vehicle communication bus 3. A fan 6 is activated by the battery control module to cool the battery pack when sensed cell temperature within the battery exceeds a pre-determined threshold or range of values which correspond to a range of fan speeds and cooling rates.

FIG. 2 is a block diagram schematic of a currently available HEV operating system as modified by a retrofit system constructed in accordance with the invention. The advanced battery system retrofit to the vehicle will periodically transmit information about the advanced battery 40 to the CDU 60 via the bus 3. This information may contain voltages, temperatures, battery current or other control information such as cooling fan status or charger status. Information can be transmitted through extra space on the existing vehicles communication network. The CDU also can have modes that instantly show battery maximums, minimums, variance and general health. In the present embodiment, information is available to report all of these as required.

The CDU 60 transmits all necessary information to the existing vehicle hybrid control system in order to emulate the stock vehicle's previous battery control system (removed during conversion). It also has the ability to enable a "turtle" mode or open the contactors if the operational envelope of the batteries is exceeded.

When the advanced battery 40 has sufficient charge, the CDU 60 encourages the existing hybrid control system to use more battery energy by reporting a high battery SOC, thus encouraging the existing hybrid control system to attempt to discharge the battery (by using more energy) down to an equilibrium SOC targeted by the stock vehicle control. The user may have inputs as to when the battery energy may be used, as well, within the limits of safe and reliable system operation.

The CDU 60 also displays information to the user, such as the state of charge (SOC) of the advanced battery (in numeric or graphic form) and the amount of power or current being drawn from the battery or being used to charge the battery. Additional status information about the performance of vehicle (miles per gallon, watt-hours per mile) or performance of the battery (voltages, temperatures) may also be displayed.

Information about the amount of power being requested by the user (accelerator pedal position) may be displayed graphically with an indication of the maximum power request needed to stay in EV mode (gasoline engine off). This information could be used by the driver to regulate driving habits in a way that reduces the amount of time the gasoline engine is running and thus reduces gasoline consumption.

The CDU also can have modes that instantly show battery maximums, minimums, variance and general health. In the present embodiment, information is available to report all of these as required.

For a prototype vehicle, a retrofit PHEV conversion was performed on a 2004 Toyota Prius as described below to install a 9 kWh Valence™ lithium-ion battery with 40 Ah capacity and provide the vehicle with an "electric only" range of 50-60 miles using about 80% (32 Ah) of the battery capacity. In real-world use, this translated into boosted mileages of 100-180 mpg (dividing mileage driven by gasoline usage), since many trips were less than the electric-only range and the gasoline engine was not used. At the same time, electric energy usage was in the range of 100-200 Wh/ml).

In effecting the conversion, the stock 1.3 kWh NiMH battery pack (nominal ratings are approximately 6.5 Ahr at 202V) was removed from the vehicle, as well as the three contactor relays and the Prius battery current sensor. The contactors and current sensor were repackaged in the rear of the car and the VIT 48 was given the ability to measure the battery current. Contactor control remained with the hybrid control module 1 but is governed in part by information provided to the hybrid control module by the VIT 48 and CDU 60 in this embodiment. A new 9 kWh (6.9× stock battery rating) Lithium Ion battery pack 40 consisting of eighteen Valence™ U1™ 42 Ahr LiFePO (i.e., lithium iron phosphate) battery modules was assembled on top of a base plate fastened to the rear cargo area. Each module, in turn, consisted of four groups of thirty-three parallel cells connected in series in each module. The eighteen modules were assembled in three groups of six modules in a 2×3 configuration on top of the base plate (under the normal carpeted cargo area). A box was provided around each group of six modules to provide structural rigidity and direct cooling airflow. A lid was placed on top of the entire battery system to seal the apparatus and provide structural integrity for a normal vehicle environment. Openings were provided in the bottom of the battery box to permit coolant to flow past the modules and exit the apparatus. The coolant is forced into the top of the battery box using the existing Prius battery-cooling fan described below.

The battery pack was outfitted with 3 EnergyCS Lithium cell-monitoring systems (LCM) 42 *a-c* (one for each group of six modules, or "pod"). The LCMs 42*a-c* report individual cell voltages (4 voltages per module, 24 per pod) as well as module temperatures (6 per pod) via an RS485/MODBUS serial communication system 44 back to a 485/CAN converter node 46, which collects information from the LCMs to present onto the vehicle's controller 60. The configuration of the interface electronics (42 a-c, 46, 52, 48) can be organized in a variety of ways by one of ordinary skill in the art to achieve the same functionality. The LCMs function to balance the batteries and communicate the crucial parameters of the batteries using RS485 (an Electronics Industry Alliance (EIA) standard for multipoint communications) and ModBus (a known communications protocol). It can be noted that some manufacturers have other modules that can report the same information in place of the LCMs, and that the LCMs may not be needed in such cases. The goal, of course, is that the elements of the system must be able to communicate all data regarding the battery system in a way that can be digested by the vehicle's hybrid components depicted in FIG. 1, but with or without a basic hybrid battery and its control module (4, 5).

The 485/CAN module 46 (part of the advanced battery system) not only interfaces between the LCM communication bus (44 and the vehicle communication bus 3, but also controls the existing Prius battery-cooling fan 6 by way of a pulse width modulated (PWM) output. The existing Prius battery-cooling fan is routed using pre-existing tubing into the top of the battery box. Battery temperatures reported by the LCMs are used to determine the needed fan speed required to cool or heat the battery pack. The Toyota Prius Manuals contain information pertaining to the use of the fan. A simple PWM control output which can vary duty cycle to the fan based on battery temperatures was implemented as an additional output from the CAN/485 module 46 in the original embodiment of the invention and later by similar means as part of the VIT 48.

In addition to the 485/CAN module 46 in the Advanced Battery System there is a VIT module 48 designed to measure battery pack current using the existing Prius battery current sensor. The VIT also measures the total battery pack voltage and reports total voltage and current periodically (10 Hz) on the vehicle's CAN bus 3. This could also be replaced with customized circuitry as long as the pack voltage measurements are isolated. Information about reading the current sensor can be found in the Prius repair manuals Nos. RM01R0U1, RM01R0U2, RM01R0U3 and RM01R0U4 for the 2006 model year, the contents of which are hereby incorporated by reference.

The display unit of the CDU 60 is mounted on the dashboard of the car, and attached to the vehicle CAN bus 3, power, ground along with a wire to activate the "EV" button found on the Prius Hybrid ECU. The CDU has a display, CAN communications, 485 communications and general purpose input and output. The CDU 60 receives battery voltage and current information (from the VIT 48) and individual cell and temperature information (from the 485/CAN module 46) and uses this information to make control decisions and, in some cases, echo the raw data to the existing hybrid control system so as to emulate the prior vehicle battery controller.

There are several different voltage sources and levels of isolation within the battery system. An isolated supply represented by (p) and (q) provides sensing power to the BMS 42. Many of the other modules are powered by the vehicle's auxiliary battery bus represented by (t) and (u), which is often 12V and negative chassis referenced, but may be other levels. Input power to the system can be any level and AC or DC, with earth or floating ground as required for safety. The input power to the system is represented by (w) and (v). The high voltage battery system bus from the battery to the vehicles HV components is represented by (r) and (s). Other high voltage buses may exist within or outside of the invention, depending on the requirements of the application. A galvanic isolation barrier is shown in the diagram, illustrating that certain system components will benefit from being isolated for safety or measurement reasons as one of ordinary skill may determine.

The CDU 60 contains an SD flash memory card writer that stores information about the battery pack and vehicle performance for later analysis. To ensure optimal use of the SD flash cards, a specialized file system was developed, which is described later in this document. LEDs are present to provide "at a glance" system status information, as well. Embedded non-volatile memory may be used in place of removable media.

In accordance with one preferred feature of the invention, certain operating information concerning the vehicle is displayed in a quickly comprehensible manner to the driver to enable the driver to optimize the vehicle's performance. These visual cues also serve as a training tool for drivers who are not familiar with the vehicle characteristics. In order to encourage the driver to maximize the "electric only" operation of the vehicle, information is graphically displayed showing the driver how much power the driver can demand before the gasoline engine turns on. The system accordingly graphically displays the instantaneous power request (accelerator pedal position) on a dashboard display in a manner that allows the driver to modify the power requested during EV driving (gasoline engine off) before the power demand reaches a point which requires the gasoline engine to turn on. This feature allows the user to achieve maximum performance while still using a minimum of gasoline and having a minimum or no gasoline engine "on" time.

Preferably, the CDU 60 displays the information on an 8-line LCD display, although one of ordinary skill may use more or fewer lines to display information relevant to their needs. The top lines of the display represent a horizontal bar that moves in relation to accelerator position information received from the vehicle's stock hybrid control system via the CAN bus 46. An electronically generated arrow adjacent the bar graph indicates the highest level the accelerator can be depressed, in view of the then-current driving parameters, without activating the gasoline engine. Whenever the gasoline engine is off (determined by a zero fuel-consumption reading from the "fuel use" information transmitted by the existing hybrid system on the CAN bus 46) the arrow is electronically positioned with respect to the graph to indicate the point at which the gasoline engine will turn on; i.e., the level of power request (accelerator position) that will activate the engine. The positioning of the arrow is the result of calculations based on the following preferred parameters: When the vehicle is in "EV mode", the accelerator may preferably be depressed up to 60% at speeds less than 34 mph before the gasoline engine will turn on; between 34 and 40 mph the accelerator may preferably be depressed up to 30% before the gasoline engine will turn on. At speeds over 40 mph, if the gasoline engine turns off, power may be re-applied up to 22% (accelerator position) before the gasoline engine turns on. Thus, the arrow indicating the throttle position that will cause the gasoline engine to turn on moves horizontally underneath the throttle position bar depending on the vehicle operating conditions and the availability of energy from the battery. (Those of ordinary skill in the art will recognize that these parameters are not critical, and that the system can utilize other parameters or even variable parameters as desirable.)

Accordingly, the arrow is preferably displayed below (or above) the moving bar that indicates accelerator position, to show the highest level in the current condition to which the accelerator may be depressed before the gasoline engine is anticipated to turn on; i.e., when the bar reached the arrow, the gasoline engine will turn on. This feature allows the driver to maximize performance while minimizing gasoline engine on time if so desired.

Below the accelerator bar on the display unit, there is preferably a "power use" meter in the form of a second displayed graph showing battery current (e.g., in amps). The second bar graph will grow from left to right as more current is drawn from the battery. The bar graph will preferably grow from right to left for current being delivered to charge the battery. (Regenerative braking, for example, would make the bar grow from right to left). Thus, on a single graph, the user can easily see both relative electric power consumption and generation.

Below the "power use" meter is a row of electronically displayed markers (sixteen diamond-shaped markers in the present embodiment indicating remaining charge in the advanced battery system (as measured by accumulated amp-hours measured using the current sense indicated by the VIT module). When the advanced battery system is "full", the screen displays all 16 diamonds indicating a reported SOC of 79.5% to the vehicle (and actual SOC of 97% or more). The diamonds represent the true usable state of charge of the invention's battery system. When the diamond row is full, the invention's battery is full, and when the diamond row is empty, the invention's battery is "empty" (i.e., no longer used to provide boosted "electric-only" range, and the vehicle will revert to charge sustaining mode.

Figure 3:
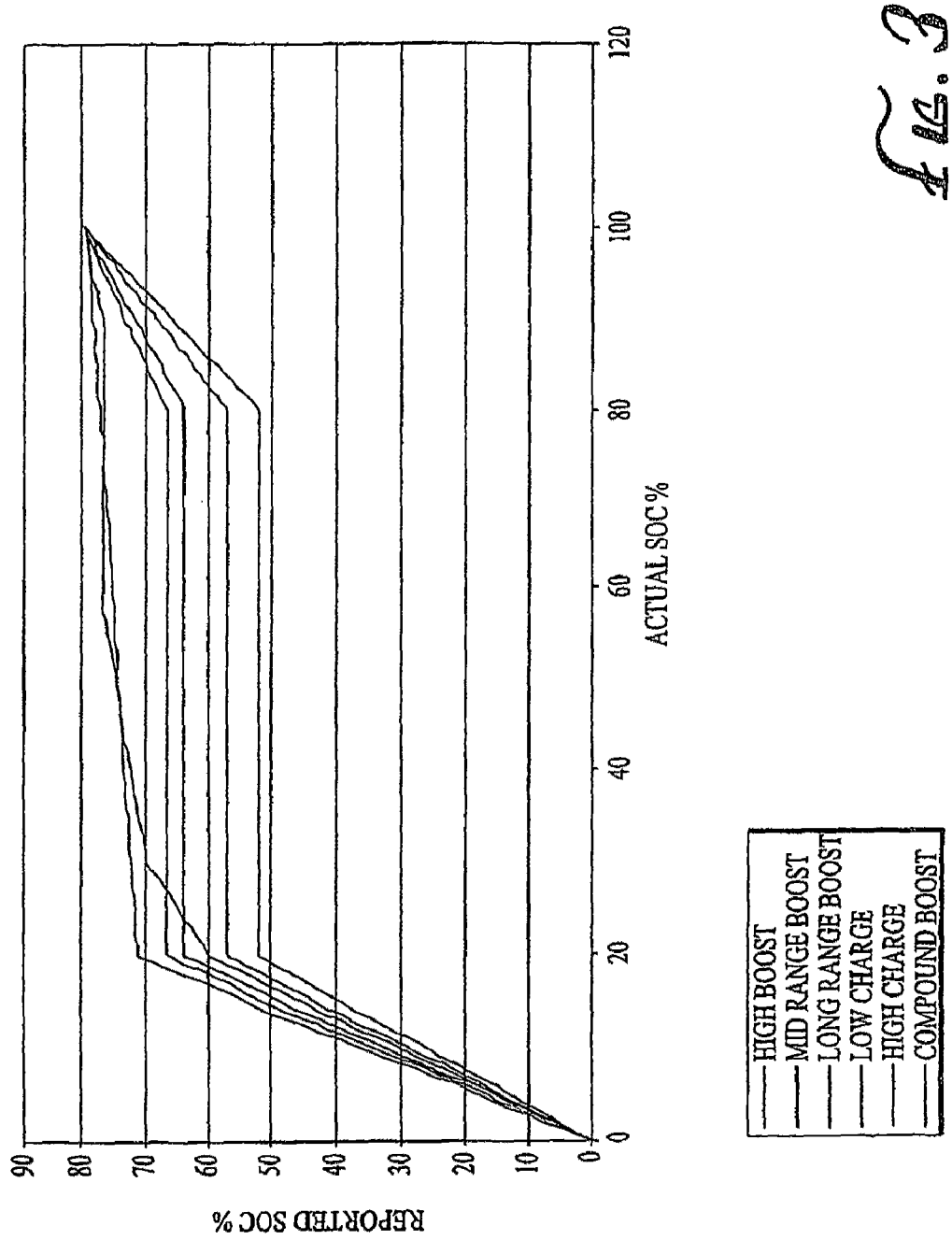
FIG. 3 is a graphic illustration of SOC ("state of charge") mapping possibilities. The real battery state of charge on the horizontal axis is mapped to the SOC reported to the vehicle to get desired plug in and EV characteristics while the invention's battery remains within acceptable operating limits and has usable capacity remaining. After the energy has been depleted, the SOC is reduced to match or approximate the remaining energy that would be available from the original battery pack to force the vehicle to simulate its normal HEV charge sustaining mode.

In the invention's present embodiment, as energy is drawn from the battery (as described below), the diamonds disappear as SOC declines, at a rate of one diamond per 2 Ampere-Hours ("Ahrs") (i.e., each 0.5% drop of reported SOC). The diamonds provide the user with a "real" state of charge view of the usable energy in the invention's battery. When the capacity of the battery is approximately 80% discharged (i.e., 32 Ahrs used) the last diamond will disappear representing the step from 72% reported SOC to 71.5% reported SOC. From this point, no indication is given of remaining battery capacity and 0.5% changes in reported SOC are indicated for 0.05 Ah changes in battery charge rather than 2.00 Ah as measured during the "boosted" driving session. At this point the Prius will still attempt to draw from the battery to reach an equilibrium point of about 62%, but only about 1 Ahr will be removed from the battery to get there (resulting in a total of 34 Ahrs removed, or close to 18% true SOC). The real state of charge of the invention's battery may be mapped to follow a curve such as is illustrated in FIG. 3.

With Ahrs now similarly matched to the previous Prius battery controller's reporting of SOC, the vehicle will perform more or less like the standard, unmodified vehicle with the reported SOC varying from 50% to 70% but the actual true SOC staying between 15% and 20%. Once the advanced battery system is recharged, the reported SOC will be reset to 79.5% and all 16 diamonds will re-appear on the CDU display. The invention's battery system will operate efficiently in charge sustaining modes at lower states of charge than the battery system embodied by the prior art. However, the invention's battery system requires that charge not be depleted beyond that which will provide enough energy and power to maintain vehicle performance and thus the invention eventually requires operation in charge sustaining mode. One of ordinary skill in the art will observe that the limits herein suggested could or might require modification to keep the battery within acceptable performance limits and life cycle expectations. One of ordinary skill in the art would also see that as the battery ages, the acceptable operating limits will also change.

While the reported SOC is below 72% and the vehicle is no longer in boosted/battery discharge mode (i.e., battery sustaining mode), the CDU directly emulates the prior vehicle battery management system. However, during boost mode, the CDU will also attempt to force the vehicle into the vehicle EV mode by selecting the EV mode wire on the vehicle hybrid ECU. The EV mode changes the vehicle hybrid parameters at which the vehicle can remain in EV (gasoline engine off) mode. The CDU may force the EV mode off under various conditions to provide a smoother transition from EV to non-EV mode or to force the engine on so as to heat up the catalytic system to lower vehicle emissions. These limits will be different for different vehicle embodiments and may, at times require adjustment to deliver acceptable performance.

Figure 8:
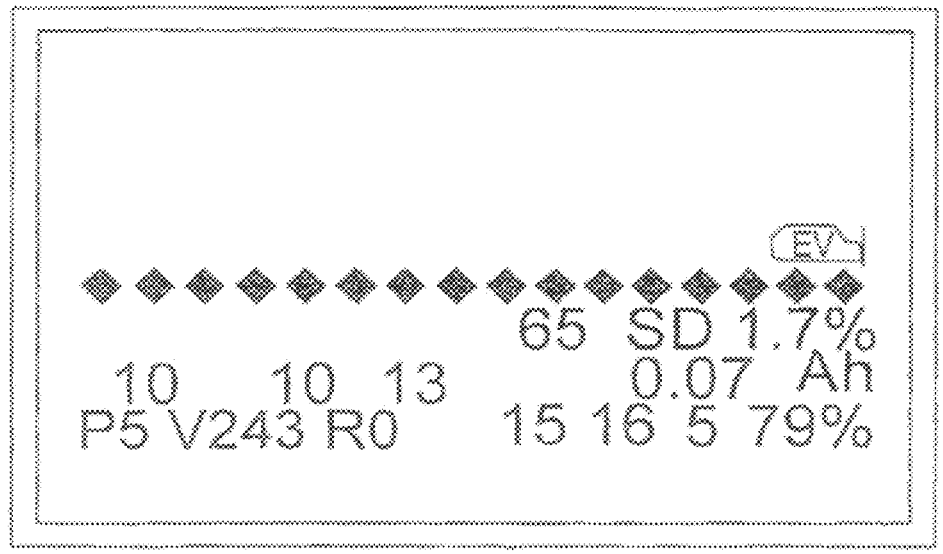
FIG. 8 is a front elevation view of a CDU 60 constructed in accordance with the invention. The CDU acts in concert with the balance of plant for the battery system 46, 48 and those items connected to them or subsequently connected to items connected to battery system 46, 48. Displayed features are labeled including a cell variance graphic, cell average and maximum temperatures, real and reported states of charge, EV mode, pack voltage, 12V system status, engine rpm, and other information such as relative regen/discharge limit, Ah depletion, SD card memory usage, catalyst temperature calculations, and communication bus traffic status.
Figure 9:
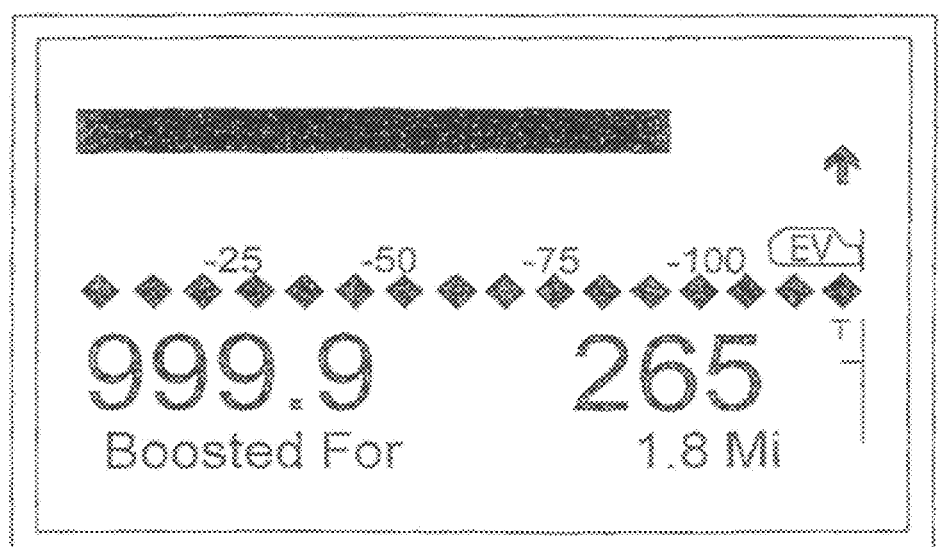
FIG. 9 is a front elevation view of another viewing screen of the CDU of FIG. 8, which shows battery current, throttle position and engine ON threshold arrow, real SOC, EV mode, engine coolant temperature, and trip boost information for the last ½ mile and last discharge cycle.
Figure 12:
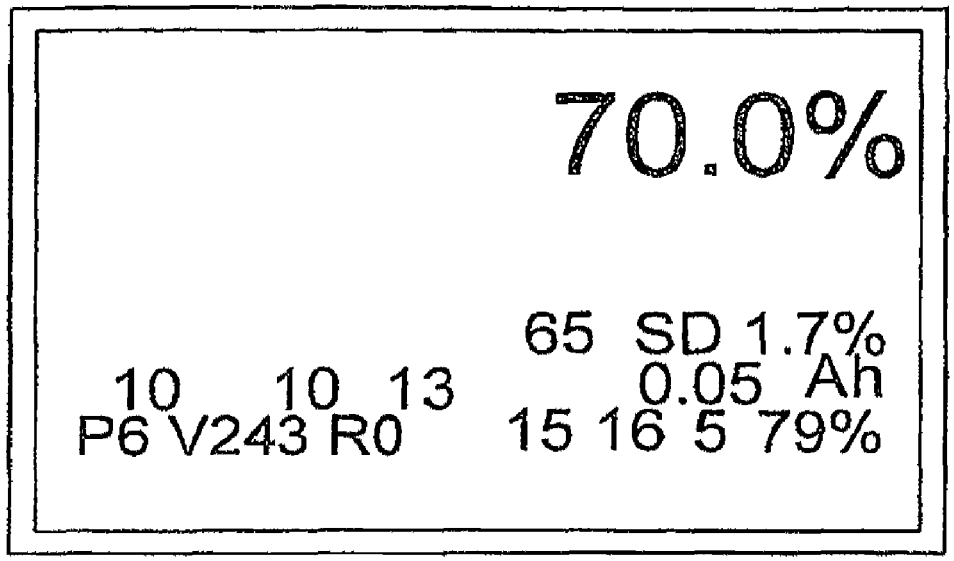
FIG. 12 is front elevation view of another viewing screen of the CDU of FIG. 8, showing the reported SOC of 70% and less than 6% usable boost or EV capacity remaining (no diamonds).
Figure 13:
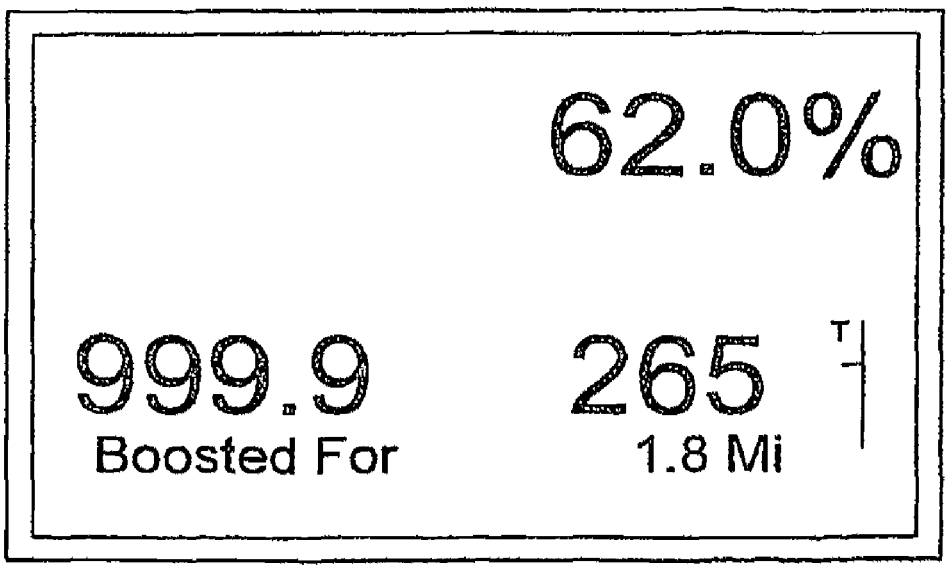
FIG. 13 is a picture showing the reported SOC of 62% and no remaining boost or EV capacity. The remaining capacity in the battery at this point is for use in the charge sustaining, or normal HEV mode.

In addition to the above mentioned on the CDU display, the CDU may also display information about the advanced battery system such as cell voltages, variances between battery bulk parameters, system limits, max/min data extremes and battery and other component or ambient temperatures as required. This is illustrated in FIG. 8. The CDU may also display user efficiency information such as recent mpg, over-all mpg since recharging and average mpg for the boosted cycle (once the transition from battery discharge to battery sustaining modes has occurred). The CDU may also display information about electrical efficiency such as recent Wh/mile, over-all Wh/mile since recharging, and average Wh/mile for the boosted cycle. Additionally the CDU may also calculate an odometer by integrating the instantaneous vehicle speed as detected from the exiting hybrid control system over the vehicle CAN bus and display this has "trip miles", as shown in FIGS. 9 and 13. The trip duration of the boosted driving mode will be displayed when the boost mode is finished, has also displayed in FIGS. 9 and 13.

Thus, the system herein also serves as a training tool for drivers who are not familiar with the vehicle characteristics by giving visual cues to assist the driver in learning how to optimize the performance of the vehicle. Other sensory feedback may be provided to the driver as training cues.

Nominal operating voltage on the prototype is 230V with a charging voltage of 250V. Charging via external electric means is currently done to 250V and maintained at 250V for 1 hour before terminating charge. Charge may also be controlled and terminated by battery temperature, cell voltage, or number of cells which have reached balancing. The vehicle has software and hardware interlocks on the charger to prevent driving away while plugged in, and break away disconnect features at the charging connection. If the charger requires it, contactors may be installed between the charger and the utility grid, as shown in FIG. 2, (w) and (v), or between the charger and the battery as shown in FIG. 2, (y) and (x).

The preferred embodiment has a default mode that utilizes a flexible battery state of charge (SOC) system which utilizes different scales for the quantity of energy/charge during battery discharge/boosted mode and normal hybrid (i.e., battery sustaining) modes. This sliding scale of real SOC or true Amp-hours to create a reported SOC to the existing hybrid vehicle control system allows correct tracking of true battery SOC while reporting a different SOC scale to the vehicle to achieve the desired operational results. Various baseline SOC mapping strategies are shown in FIG. 3. The baseline strategies can be modified based on pack age, cell temperature, discharge rates, and cell voltage. The mapping curve can be complex, and can allow for user input within certain parameters. For example, if it is desirable to have substantial EV mode available after a long trip without recharging, a user could disable the EV boost mode and operate the vehicle in a charge sustaining mode for a substantial amount of time, and then re-enable the EV boost mode to resume the use of energy from the battery. Many cities are experimenting with zones which prohibit or tax the use of combustion engines in certain zones, and the ability of a user to manually alter the pre-mapped discharge curve in order to reserve battery energy for the use of the EV mode in these cases is an advantageous characteristic of the present embodiment of the invention.

For example, on the existing prototype, boosted operation of 71.5% to 79.5% reported SOC (where the Prius actively attempts to discharge the battery) takes place over 80% of the advanced battery's true capacity (32 Ahs on the prototype). From 71.5% down to 0%, the Ah scale is greatly compressed (i.e. SOC scale greatly increased) such that the SOC reacts more like the previous smaller hybrid battery. The Prius will actively try to maintain an SOC of approximately 62%. A narrower band might be used to improve the battery cycle life, or to facilitate a larger reserve.

Discharge below a CDU reported 42% is highly unlikely as this would represent the total discharge from full of 35 Ah or 13% true SOC. Under most normal situations the Prius will attempt to maintain approximately 62% SOC+/−10% (i.e. 33 Ah depleted +/−1 Ah or 18% SOC+/−2% true SOC).

In summary, the sliding SOC scale allows one or more modes that will discharge the battery to provide assistance to the drive cycle, one or more modes that can keep the battery at or near the same SOC, and one or more modes that could charge the batteries.

The controller and algorithms are capable of being reprogrammed to different set points, slopes and curves depending on different vehicle platform requirements and different size larger battery systems. The controller is capable of storing several curves at once so that the user can select different functionality for particular driving requirements.

The invention has alternate modes for customizable SOC optimization. For example, an option where the user may wish to program the controller to utilize all or none of the battery capacity during a particular stage of their daily commute or longer trip. The controller allows the user to utilize the pure electric driving range in ways that would give the vehicle an advantage traveling within and between cities which might have EV only driving zones. For example, a consumer wishes to drive from city A to city B, both of which require EV only driving in their commercial districts. A number of driving scenarios might exist, including:

1) Default is HEV Boosted mode until battery cannot sustain boost.
2) EV only uses the same SOC as the HEV Boosted mode but uses the EV capabilities more aggressively.
3) Mid range boost uses less power but has a longer range of boosted driving
4) Long range boost uses even less power for longer trips.
5) Neutral mode maintains the same SOC so that the user can save the EV range for a later portion of a trip.
6) Gradual Charge slowly charges the vehicle while driving
7) HEV Opportunity Charge this heavy charge is reserved for situations where EV mode will be necessary in the near future and the battery is at a low state of charge.

There may be certain applications where the default 60 miles of assisted driving would not be the ideal use of the grid power. For example, if somebody was going on an extended drive, the energy might be more efficiently distributed at a lower power for a longer amount of time.

At other times, the driver may wish to save some of the available energy for low speed city or EV driving at the end of their trip. In order to accomplish this, several modes of operation are available. The normal mode described above will always try to inject energy into the driving cycle regardless of other system status or operator requirements. Operating in this mode will deplete the battery of the present embodiment of the invention within about 60 miles.

Other modes are available:
1. There is a less aggressive mode that will extend the injection range but decrease the power contributed by the battery.
2. There is a mode that will keep the state of charge exactly where it is so that the EV range can be saved for the end of the trip.
3. There is a mode where the hybrid system will lightly charge the batteries in case long periods of EV are necessary and the pack is already depleted.
4. There is a mode where higher charging current can be demanded in case the user quickly needs to be able to recover some EV range without plugging in.

See FIG. 3 to see one possible set of charge and discharge curves. Diagram 2 shows a curve based on delta SOC that should maintain the current state of charge for the batteries. The user could switch modes throughout a trip to optimize the effects of the additional energy.

The general goal of each of the modes is to provide a certain charge or discharge current as long as the battery SOC remains in a certain range. Mapping the real battery SOC to a reported SOC will cause the desired results. Another method is to use feedback on current rather than an SOC target. This allows the pack to be "floated" at any SOC the user desires. This represents a different method to accomplish the same driving modes mentioned above. By using figuring out the average current over time, a user can change the reported SOC to achieve a given level of discharge or charge. This flexibility enables the user to numerically select a driving range or a boost time for their particular route, thus maximizing the effectiveness of the added electrical energy available. Conversely, the user could select a charge rate if the pack was depleted and EV range was a necessity.

Battery Health Display

When looking at the health of a battery pack, it is important to know the maximum and minimum values for voltages of the cells within the pack. It is also important to know the variance of the pack. Finally, in certain applications, if the voltages exceed certain setpoints or go below others, the application will limit performance or halt. The ability to quickly see all of this information on a single screen can be quite important.

There is a method that allows all of this information to be understood at a glance. See diagram 4. On the far left hand side and the far right hand side are arrows that correspond to fault or reduced performance points. If the maximum voltage goes to the right of the right arrow, or the minimum goes to the left arrow for a certain amount of time, the applications performance will change.

There can be several arrows indicating different possible events. The bar graph straddles between the minimum voltage and the maximum voltage. The farther to the right these two values are, the higher the voltages. Similarly, the farther to the left they are, the lower the voltages. The length of the bar itself is the difference between the maximum and the minimum voltage or the voltage variance. In a healthy pack, the bar should remain quite thin. However as the pack becomes imbalanced or cells become weak, the bar would become wider under heavy currents. When placed right beside a gauge or display showing current, the user can quickly compare the variance to the current levels and see how healthy the cells within the pack are.

This technique could also be applied to other measurable quantities such as temperature. Display showing bar of varying width between arrows to indicate battery pack state of health. Ordinary battery systems may treat all batteries as one; this method treats the differences between batteries as having equal or higher significance to the bulk parameters of the battery system. The length of the bar is relative indicator of battery health. Placing the bar between the two arrows gives the user an instantaneous view of battery health and how close it is to its operating envelope. Top view is unhealthy battery pack operating within normal range. Bottom view is healthy battery operating within normal range.

In the diagram, voltage or thermal variance is depicted. Other values may be depicted, such as amount of balancing, current between parallel strings, or differences in calculated capacity. Multiple bars may be staggered or nested. Ranges may be different scales with same endpoints, or same scales with different endpoints. Bars may be arranged in any orientation. Other shapes may be used besides rectangular bars to convey the same information, for example pie shapes with varying wedge sizes and/or moving arc limits for system fault indication.

Flash FAT File System for SD Cards

Data logging innovation within the CDU used for hybrid vehicle control

One of ordinary skill in the art will be able to discern that the methods described here are not limited to vehicle applications and are portable across any platform which uses non-volatile flash memory for non-volatile data storage.

In regular applications involving flash memory, the entire file is written at one time. This means that some areas of the file allocation tables (FAT) are updated, some memory locations are updated and the directory entries are updated. With one update per file, the flash memory will not exceed the number of writes in the warranty for quite a while. Furthermore, certain sections such as the FAT tables can be moved around periodically so that no one area is stressed too much.

In data logging applications, files cannot be written all at one time. Existing data is appended to as new data is measured, observed or calculated and recorded. There are a few requirements to use flash memory technologies in a data logging application. The data must be writable as it comes in. The data file should be readable by ordinary equipment. The data logger needs to be able to be turned on and off with a minimal loss of data. When it is turned on, it needs to be able to start logging data quickly.

Using regular FAT algorithms for a data logging algorithm would result in early flash memory failure. If a 128 Mb SD card was updated 512 bytes at a time, there would be approximately 256000 writes to the directory entry before each card was filled. This would very quickly over stress that area of memory and the performance of the flash device would be compromised.

To solve the problem, information about the file must be stored within the file itself. This allows the application to locate the file size, the end of the file and other important attributes without updating the FAT tables and the directory entry for each write. Based on user inputs, the FAT tables and directory entries can then be updated only a single time to make the file computer readable.

The specifics for one implementation follow. In the present embodiment, this is the method used. In general, there are other ways that someone of ordinary skill in the art could alter the order of events or specific quantities of information written using this algorithm to achieve the same results.

To store file information, the first two bytes of each 512 byte block are reserved for a 16 bit file identifier. The file identifiers are incremented each time a new file is started. Certain values of the 16 bit identifier are restricted if they correspond to ASCII characters that could interfere with regular reading of the file.

The first time the flash card is used, the entire file space is overwritten with zeros. This ensures that random values in memory cannot interfere with the file identifiers.

When the application starts up, it checks the volume label to make sure the formatting is correct. If the volume label is incorrect, the user is asked whether or not to format the card. Once the card is formatted or if the volume label is correct, it checks the directory entries to see if the file is deleted.

Whenever the file is deleted, the application checks the first file location to find the previous file identifier. It then increments it and writes the first block of the new file. It also, fixes the directory entries and the FAT table.

If the file is not deleted, the application checks to see if the FAT entries and the directory entries are correct. If they are, it resets the FAT entries and the directory entries as if the device was full with one file.

If the file is not deleted and the entries are incorrect, it reads the first file location to find the file identifier. It then does a binary search to find the last location of the file and continues writing from there.

Someone of ordinary skill could devise methods to move functionality from one device to another, consolidate functionality into fewer devices, or distribute the functionality over more devices while still utilizing the invention.

In integrations in which the battery control module has more or less functionality, the total functionality described above is still required for the vehicle to operate properly. It is expected that someone of ordinary skill in the art would be able to evaluate the difference between one vehicle system's set of functionality and that of a different platform, and use the invention to meet a different vehicle's requirements.

The equal or larger battery system includes hardware that can replace the existing vehicle battery control computer and can manipulate the existing vehicle computers into better utilizing the new battery system without affecting other vehicle driveability or handling features. In other embodiments of the invention, the current battery could be kept and only the controller would be replaced to fully utilize existing capacity.

Other methods to try to increase the battery pack size have included adding a second pack in parallel or putting a high current bi-directional dc-dc converter in between the existing pack and a new pack. While replacing the pack and the pack control circuitry presents additional challenges, it allows for a cleaner integration into the existing vehicle platform.

The vehicle in the present embodiment is a passenger car. One of ordinary skill would be able to apply these principles to vehicles larger or smaller than a passenger car, such as a hybrid electric scooter, a hybrid electric passenger bus or a hybrid electric locomotive, for example.

A battery charger is included in the Invention to allow the larger battery to be recharged from a normal home electrical outlet (100/120/230V, 60/50 Hz) found in most industrialized nations. By encouraging the existing hybrid system to use more energy from the battery, gasoline consumption can be reduced by displacing gasoline operation with electric motor operation from the larger battery. The benefit of increased electrical operation is realized in its more efficient use of energy available, the possibility of driving without turning on the internal combustion engine, or the possibility of assisting the internal combustion engine, allowing it to burn less fuel.

The battery charger may be on board the vehicle, or off board. No limit as to the size of the charger is specified, except that the charger must be controlled so as to safely charge the electrical storage medium or battery without damage or risk to the battery, the vehicle, its occupants or service personnel, or the electrical infrastructure. It is desirable that the vehicle have at least the capability of being recharged at the user's residence or place of work without sophisticated or exclusive connection requirements, however this is not a necessary condition to make the invention function properly.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto, and that the claims be interpreted as broadly as permitted in light of the prior art.

We claim:

1. A retrofit system for converting a hybrid vehicle to a plug-in hybrid comprising:
   a battery for storing a charge sufficient to provide a vehicle with an electric-only driving range in excess of 5 miles;
   a battery management system for monitoring battery parameters indicative of the state of battery charge to produce a "true SOC" signal indicative thereof; and
   a control unit responsive the battery management system to report an inflated state of battery charge to the hybrid vehicle's hybrid control system to maintain the gasoline engine in a deactivated condition over an extended driving range.

2. The retrofit system of claim 1 wherein the battery management system includes means for collecting and reporting the voltages and temperatures of at least some of the electrochemical cells forming the battery, and
   means for communicating the magnitudes of the reported voltages and temperatures to the control unit.

3. The retrofit system of claim 1 including sensor means for monitoring voltage, current and temperature of the battery pack.

4. The retrofit system of claim 1 including means responsive to the minimally acceptable actual state of battery charge for reporting a state that causes the vehicle to function in its pre-retrofit hybrid mode.

5. The retrofit system of claim 4 wherein said reporting means maintains said pre-retrofit hybrid mode until said battery is recharged to at least a reset level from a source external to the vehicle.

6. The retrofit system of claim 1 wherein the control unit is further responsive to the temperature within the catalytic converter of the vehicle to report a sufficiently inflated state of battery charge only when said temperature is within a temperature range acceptable to the vehicle's hybrid control system.

7. The retrofit system of claim 1 wherein the control unit is further responsive to vehicle speed to report a sufficiently inflated battery charge only when the speed of the vehicle is below a speed acceptable to the vehicle's hybrid control system.

8. The retrofit system of claim 1 wherein the control unit is responsive to the same vehicle parameters as the unconverted hybrid vehicle's hybrid control system to avoid interference with important vehicle parameters that override the battery's state of charge as the parameter determining the act should inflation and the activation of the vehicle's gasoline engine.

9. The retrofit system of claim 1 wherein the control unit is responsive to the true SOC signal to re-institute the vehicle's hybrid mode of propulsion by changing the reported battery state value when the vehicle's battery capacity becomes sufficiently depleted so that further discharge of the battery is undesirable, whereupon the vehicle is returned to normal hybrid mode using the remaining battery capacity in the manner by which the vehicle's pre-conversion battery was used.

10. The retrofit system of claim 1 wherein the control unit inflates the true SOC signal in accordance with a variable inflation factor.

11. The retrofit system of claim 10 wherein the variation is based on system parameters selected from one or more of the battery age, battery cell temperature, battery discharge rate and battery cell voltage.

12. The retrofit system of claim 10 wherein the variation is determined from a selected one of a plurality of user-selected driving modes.

13. The retrofit system of claim 1 including display means controlled by the control unit and including
   first electronically-generated indicia visible to the driver during vehicle operation and indicative of the position of the vehicle's accelerator, and
   second electronically-generated indicia visible to the driver during vehicle operation and indicative of the position to which, in view of the then-current driving parameters, the accelerator can be moved without activating the gasoline engine.

14. The retrofit system of claim 1 wherein the second indicia is adjacent to the first indicia.

15. The retrofit system of claimed 14 wherein the first indicia is in the form of a bar graph having a variable length proportional to the position of the vehicle's accelerator, and the second indicia is in the form of a generally vertical line positioned adjacent the bar graph to indicate the accelerator position which, when reached, will activate the gasoline engine.

16. A method for converting a hybrid electric vehicle into a plug-in hybrid electric vehicle comprising the steps of:
   (a) adding to the vehicle's battery capacity a sufficient battery capacity to provide an electric-only driving range in excess of 5 miles;

(b) monitoring the state of charge of the vehicle's resulting battery and producing any "true SOC" signal indicative thereof;

(c) generating a "reported SOC" signal to the vehicle's hybrid control system that is sufficiently inflated to maintain the gasoline engine in a deactivated condition over an extended electric-only driving range.

17. A method for converting a hybrid vehicle into a plug-in hybrid vehicle comprising the steps of:

(a) adding to the battery capacity of the vehicle to provide charge storage sufficient to impart an extended electric-only driving range in excess of 5 miles;

(b) installing a battery management system in the vehicle that monitors the battery's parameters indicative of the state of battery charge to produce a "true SOC" signal indicative thereof; and (c) installing a control unit that is responsive to the "true SOC" signal to produce a "reported SOC" signal to the vehicle's hybrid control system that is sufficiently inflated to maintain the gasoline engine in a deactivated condition over the extended electric-only driving range.

* * * * *